Feb. 12, 1963 R. TAIT ETAL 3,077,361
SERVICING EQUIPMENT FOR NUCLEAR REACTORS
Filed July 18, 1958 3 Sheets-Sheet 3
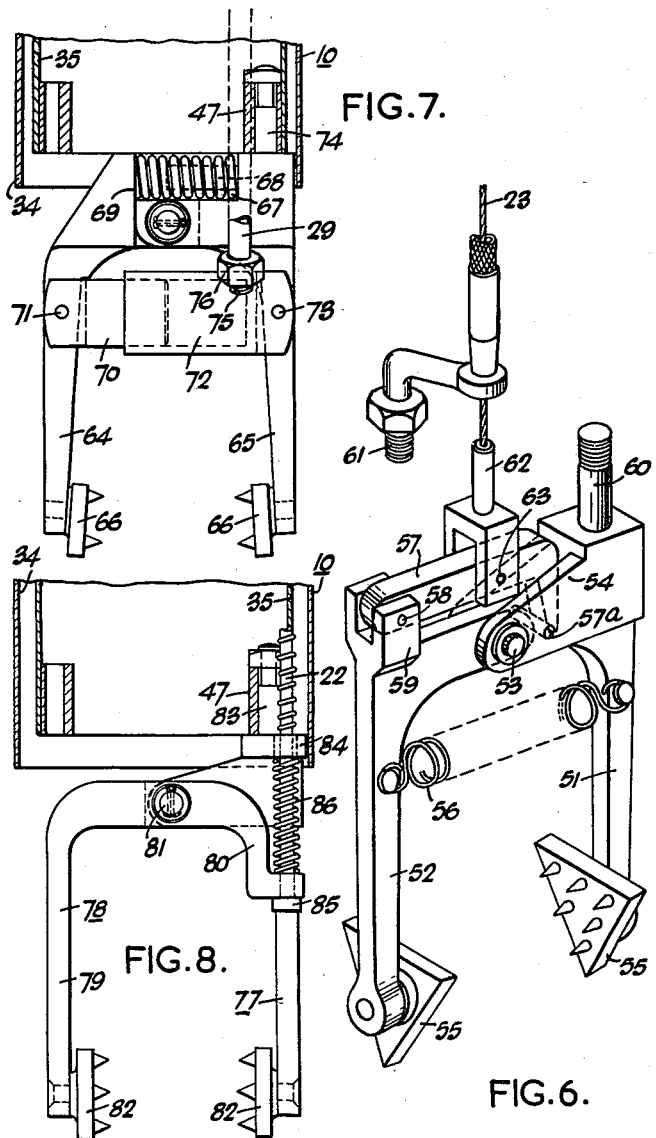
INVENTOR
ROBERT TAIT ET AL

United States Patent Office 3,077,361
Patented Feb. 12, 1963

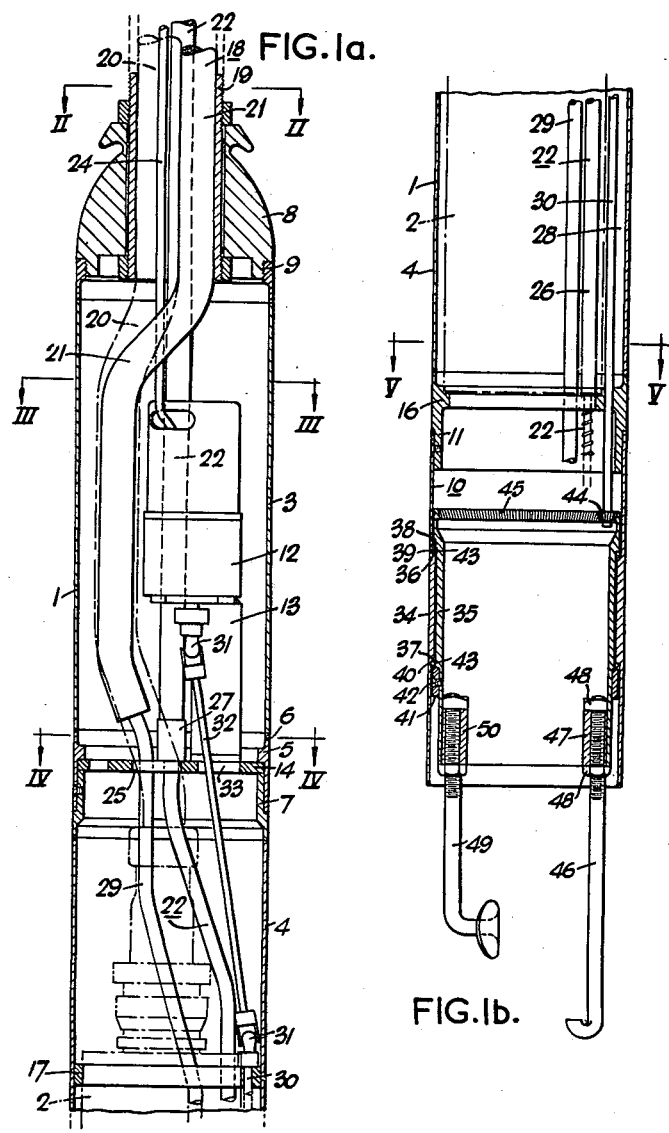

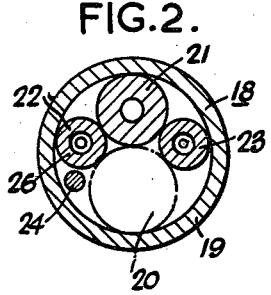
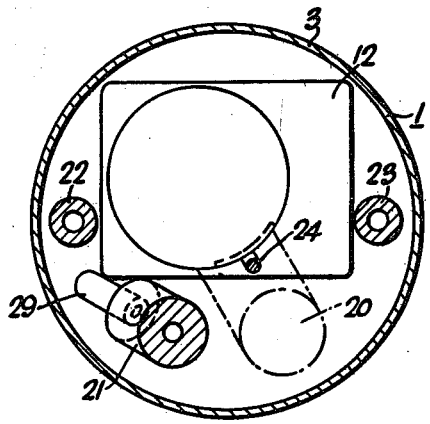
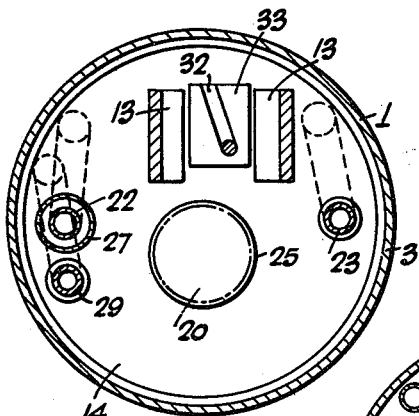
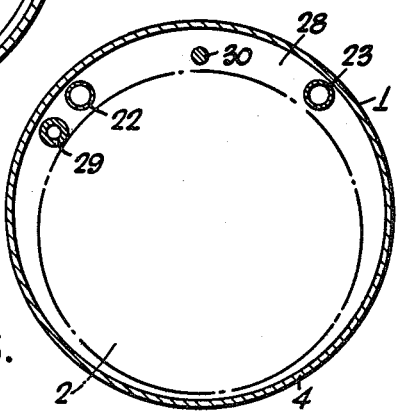

3,077,361
SERVICING EQUIPMENT FOR NUCLEAR REACTORS
Robert Tait, Seascale, Cumberland, and Robert Hugh Hall, Croft, near Warrington, England, and Charles John MacFarlane, Annan, Scotland, assignors to United Kingdom Atomic Energy Authority, London, England
Filed July 18, 1958, Ser. No. 749,449
Claims priority, application Great Britain July 19, 1957
5 Claims. (Cl. 294—66)

This invention relates to servicing equipment for nuclear reactors.

During the operating life of a nuclear reactor servicing operations may have to be carried out on the structure of the reactor. It is required that such operations be effected remotely owing to the hazards arising from radiation etc.

Television cameras have been designed of elongate cylindrical form suitable for passing through the fuel element and control rod channels of a heterogeneous graphite moderated nuclear reactor, to discover faults in the core structure of the reactor and locate extraneous objects in the channels. The present invention extends the usefulness provided by television viewing in the maintenance of nuclear reactors.

According to the invention equipment for servicing a nuclear reactor comprises a television camera of elongate form contained within a casing, a tool holder rotatable within the casing in front of the camera and means passing between the casing and the camera for rotating the tool holder and for operating tools adapted to be fitted in the holder.

One embodiment of the invention will now be described by way of example with reference to the accompanying drawings in which:

FIGS. 1a and 1b show, in longitudinal sectional elevation, the two halves of a device in accordance with the invention.

FIG. 2 is a section along the line II—II of FIG. 1a.
FIG. 3 is a section along the line III—III of FIG. 1a.
FIG. 4 is a section along the line IV—IV of FIG. 1a.
FIG. 5 is a section along the line V—V of FIG. 1b.
FIG. 6 is an isometric view of an alternative form of grab suitable for use in conjunction with the device shown in FIGS. 1a and 1b.

FIGS. 7 and 8 are elevations of two further alternative forms of grabs suitable for use in conjunction with the device shown in FIGS. 1a and 1b.

Referring to FIGS. 1a and 1b in combination with FIGS. 2, 3, 4 and 5 there is shown a device comprising a smooth contoured casing 1 containing a television camera 2 of elongate cylindrical form (shown in FIGS. 1a and 1b in chain dotted outline). The casing 1 comprises joined tubes 3 and 4 connected by a bayonet fitting 5. The bayonet fitting 5 comprises complementary parts 6 and 7 respectively seam welded to the tubes 3 and 4 forming the casing 1. The casing 1 is fitted with a top end cap 8 screwed into a tubular end fitting 9 seam welded to the tube 3 and a turret head 10 is carried by a tubular bottom end fitting 11 seam welded to the tube 4.

A geared motor 12 is carried by a pair of angle brackets 13 welded to a plate 14 located in the casing 1 between the parts 6 and 7 of the bayonet fitting 5. The television camera 2 is located in the tube 4 by an internal stepped flange 16 in the end fitting 11 and a drilled plate 17 welded inside the tube 4.

A composite cable 18 fixed in passage through the end cap 8 comprises an outer flexible casing 19 containing inner flexible members, such members including a coaxial television cable 20, a compressed gas pipe 21, a "push-pull" cable 22, a Bowden cable 23 (see FIGS. 2, 3, 4 and 5) and an electrical lead 24 for the motor 12. The cable is adapted to be attached to a winding drum (not shown) at the end remote from the casing 1.

The television cable 20 passes through a drilled hole 25 in the plate 14 to the television camera 2. The "push-pull" cable 22 which has an outer fixed sheath 26 is located by a ferrule 27 on the plate 14 and passes through the casing 1 in the space 28 between the tube 4 and the camera 2. A flexible copper pipe 29 also passing through the space 28 is connected with the flexible compressed gas pipe 21. The plate 17 and the internal flange 16 of the end fitting 11 are drilled to allow the passage of the "push-pull" cable 22, the Bowden cable 23 the pipe 29, and also to provide mounting for a shaft 30 which is coupled with the motor 12 by universal couplings 31 and a shaft 32 passing through a rectangular hole 33 in the plate 14.

The turret head 10 comprises an outer sleeve 34 bayonet fitted to the end fitting 11 and containing an inner rotatably mounted sleeve 35. The sleeve 34 has internal steps 36 and 37 and the sleeve 35 has an external step 38 which with the step 36 defines an annular space 39 between the sleeves 34 and 35. A second annular space 40 is defined by the internal step 37 of the sleeve 34 and a ring 41 fixed to the inner sleeve 35 by bolts 42. The annular spaces 39 and 40 are filled with ball bearings 43. A pinion 44 on the shaft 30 engages with an internal gear 45 integral with the inner sleeve 35.

In FIG. 1b the turret head 10 is shown fitted with a lifting tool, in the form of a simple hook 46. The hook is carried by a tubular bush 47 welded inside the inner sleeve 35 and is fixed by nuts 48. A guide member 49 is similarly fixed in a tubular bush 50 welded inside the inner sleeve 35 diametrically opposite to the bush 47.

An article such as a detached cap of a fuel element located in a fuel element channel in the core of a nuclear reactor may be picked up by means of the hook 46. The device is lowered down the fuel element channel by means of the cable 18 so that the hook 46 passes between the article and the wall of the channel. The inner sleeve 35 of the turret head 10 is rotated by operation of the motor 12 so that on raising the device the hook 46 is in a position to engage with and lift the article in co-operation with the guide member 49. The above operations are facilitated by the television viewing afforded by the television camera 2, whereby the article is seen, the hook 46 is positioned to pick up the article and the lifting operation thereafter continuously monitored.

FIG. 6 shows an alternative form of grab suitable for attachment to the turret head 10. The grab comprises a pair of jaws 51 and 52, the jaw being pivoted on a pin 53 between a pair of lugs 54 integral with the jaw 51. The jaws 51 and 52 are fitted with toothed jaw plates 55 and are spring loaded to close by a tension spring 56. In FIG. 6 the jaws 51 and 52 are shown held open against the loading of the spring 56 by a latch 57. The latch 57 is pivoted on the jaw 52 between lugs 59 on a pin 58 and engages with a pin 57a extending between the lugs 54 on the jaw 51. The jaw 51 is fitted with a threaded stud 60 my means of which the grab may be attached to the inner sleeve 35 of the turret head 10 at the bush 47. An arm 61 for fitting to the bush 50 provides end location for the fixed outer part of the Bowden cable 23 (passing from the cable 18 through the casing 1). The cable 23 is coupled with the latch 57 by a cable fork 62 and pin 63. In the removal of an article from a control rod channel in the core of a nuclear reactor using the grab described with reference to FIG. 6, the device is lowered down the channel with the jaws 51 and 52 of the grab held open by the latch 57. The grab is positioned to grapple the article by lowering the device down the fuel element channel and by rotation of the inner sleeve 35 of the turret head 10. The jaws 51 and 52 are engaged with the article by pulling the cable 23 to release the latch 57, so that the jaws 51 and 52 close about the article under the tension of the spring 56.

FIG. 7 shows another form of grab having a pivoted jaw 64 and a fixed jaw 65 fitted with toothed jaw plates 66. The jaws 64 and 65 are spring loaded to close by a compression spring 67 carried by a pin 68 on the jaw 65 and acting against a face 69 on the jaw 64. A piston 70 pivoted on the jaw 64 by a pin 71 acts in a cylinder 72 pivoted on the jaw 65 by a pin 73. The jaw 65 is fitted with a threaded stud 74 by means of which the grab is fitted to the inner sleeve 35 of the turret head 10 at the bush 47.

In use of the grab shown in FIG. 7 the device is lowered down a fuel element channel in the core of a nuclear reactor with the jaws 64 and 65 held open pneumatically by gas under pressure admitted into the cylinder 72 from the compressed gas pipe 21 (FIG. 1a) through the copper pipe 29 which is coupled by a union nut 76 with a threaded inlet nipple 75 on the cylinder 72 (FIG. 7). The grab is positioned to grapple an article contained within the fuel element channel by lowering the device down the channel and rotating the inner sleeve 35 of the turret head 10. Depressurisation of the cylinder 72 allows the jaws 64 and 65 to close under the loading of the compression spring 67 to engage with the article for removal thereof from the fuel element channel. The grab shown in FIG. 8, attached to the turret head 10, comprises a fixed jaw 77 and a movable jaw 78 having a jaw arm 79 and a crank arm 80. The jaw 78 is pivoted on the fixed jaw 77 by a pin 81 and both jaws 77 and 78 are fitted with toothed jaw plates 82. The grab is fitted to the inner sleeve 35 of the turret head 10 at the bush 47 by a threaded stud 83 fixed to a plate 84 integral with the jaw 77.

The "push-pull" cable 22 (FIG. 1) which passes through the plate 84 is coupled by a nipple 85 with the crank arm 80 of the jaw 78. The jaws 77 and 78 are biased to an open position by a compression spring 86 which acts between the plate 84 and the crank arm 80.

In use of this grab the device is lowered down a fuel element channel in the core of a nuclear reactor with the jaws 77 and 78 held open by the compression spring 86. The grab is positioned to grapple an article contained within the channel by rotation of the inner sleeve 35 of the turret head 10 and, as shown in FIG. 8, the jaws 77 and 78 are closed upon the article by a pull applied to the "push-pull" cable 22.

We claim:
1. In servicing apparatus having a tubular casing and image transmission means mounted in the casing adjacent one end portion thereof in position to transmit an image of an object disposed within the space defined by the peripheral limits of the end projection of said casing end portion, said image transmission means being separated from at least one wall portion of the casing by a clearance, grappling means including a sleeve member extending into said space from within said casing end portion substantially coaxial therewith and no part of which has a diameter greater than that of the casing, means connecting said casing end portion and the sleeve member for rotation of the sleeve member relative to said casing, a grappling tool mounted on the end of said sleeve member remote from the image transmission means for movement within said space, and actuating means for the grappling tool extending through the clearance between the casing wall portion and the image transmission means.

2. Apparatus according to claim 1 further comprising means extending through the clearance for effecting rotation of the sleeve member relative to said casing.

3. Apparatus according to claim 1 wherein the image transmission means is mounted eccentrically in the casing.

4. Apparatus according to claim 1 wherein the grappling tool includes cooperating hook and guide members mounted diametrically opposed to one another on the end of said sleeve member remote from the image transmission means.

5. Apparatus according to claim 1 wherein the grappling tool includes a spring-loaded two arm grab retained in open position by latch means releasable by said grappling tool actuating means.

References Cited in the file of this patent
UNITED STATES PATENTS

| | | |
|---|---|---|
| 1,653,547 | Cameron | Dec. 20, 1927 |
| 2,355,086 | Lang | Aug. 8, 1944 |
| 2,522,466 | Schneider | Sept. 12, 1950 |
| 2,595,632 | Bivings et al. | May 6, 1952 |
| 2,849,530 | Fleet | Aug. 26, 1958 |
| 2,861,699 | Youmans | Nov. 25, 1958 |

FOREIGN PATENTS

| | | |
|---|---|---|
| 82,993 | Denmark | June 17, 1957 |

OTHER REFERENCES

"Nucleonics," vol. 14, No. 12, Dec. 12, 1956, pp. S22–S23.

Bolton et al.: "Nucleonics," vol. 13, No. 6, June 1955, pp. 52–55.